March 4, 1930.  R. ZIGLER  1,749,729
ANTIGLARE DEVICE
Filed Dec. 10, 1928
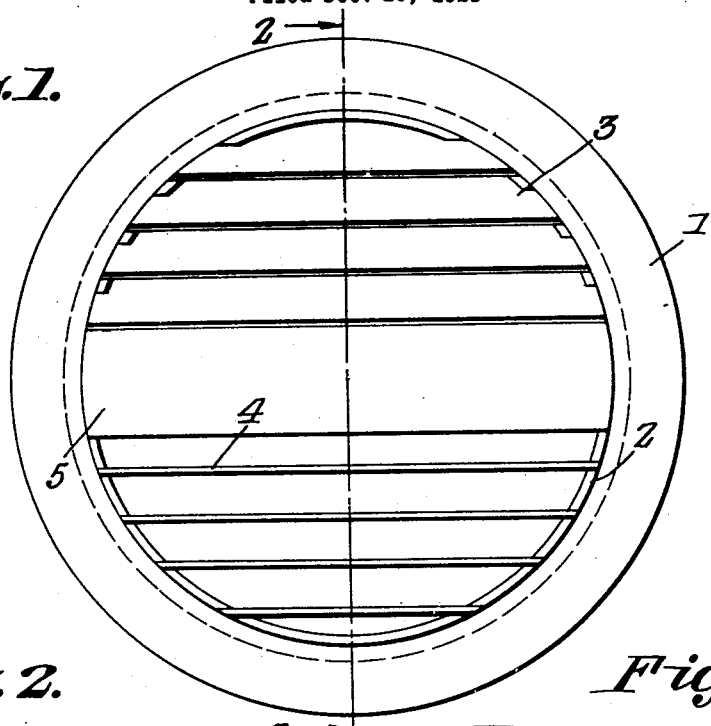
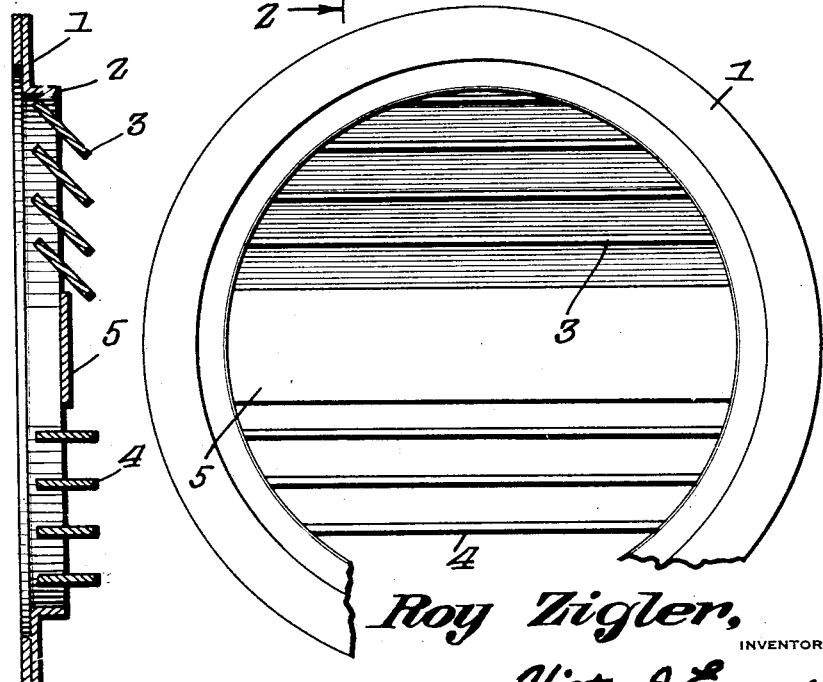
Roy Zigler, INVENTOR
BY Victor J. Evans
ATTORNEY Patented Mar. 4, 1930

1,749,729

UNITED STATES PATENT OFFICE

ROY ZIGLER, OF PLYMOUTH, OHIO

ANTIGLARE DEVICE

Application filed December 10, 1928. Serial No. 324,997.

This invention relates to an anti-glare device for the headlamps of automobiles and the like, the general object of the invention being to provide means for preventing the rays of light from a lamp from blinding pedestrians and drivers of other vehicles and also to provide means for making the lamps more effective in fog.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is a front view of the device.

Figure 2 is a section on line 2—2 of Figure 1.

Figure 3 is a rear view.

In these views, the numeral 1 indicates a ring which is adapted to be fastened in any suitable manner at the front of a lamp, this ring being provided with the flange 2 to which the strips for controlling the rays of light from the lamp are attached. The strips 3 at the upper part of the device are diagonally arranged and slope downwardly and outwardly, as shown, and the strips 4 at the lower part of the device are horizontally arranged. A strip 5 of considerable width is transversely arranged at the center of the device so that it will intersect the horizontal rays of light passing from the bulb of the lamp. The strips 3 act to deflect the rays of light downwardly and prevent the rays of light from blinding persons in front of the vehicle, while the strips 4 permit the rays of light to pass straight ahead from the lower part of the lamp, but prevent the rays from being deflected upwardly into the eyes of persons in front of the vehicle.

Thus I have provided simple means for preventing the rays of light from a lamp on an automobile or other vehicle from blinding drivers of other vehicles, while not interfering with the proper illumination of the road and this device enables safe driving in foggy weather.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a ring-shaped supporting member, a transversely arranged strip of considerable width extending across the central part of the opening and having its ends connected with the ring-shaped member, a number of diagonally arranged strips extending across the top part of the opening and sloping downwardly and outwardly and having their ends connected with the supporting member and a plurality of horizontally arranged strips extending across the lower part of the opening and having their ends connected with the supporting member all of said strips being formed of opaque material and spaced apart.

In testimony whereof I affix my signature.

ROY ZIGLER.